United States Patent [19]
Corder

[11] 3,952,389
[45] Apr. 27, 1976

[54] BURNISHING TOOL

[76] Inventor: Carl L. Corder, 1351 Acton St., Berkeley, Calif. 94710

[22] Filed: Feb. 20, 1975

[21] Appl. No.: 551,371

[52] U.S. Cl. .................................. 29/90 R; 72/211
[51] Int. Cl.² .................... B21C 37/30; B21D 9/08
[58] Field of Search ............. 29/90 R; 72/479, 703, 72/211; 12/104; 81/7, 8

[56] References Cited
UNITED STATES PATENTS

| | | | |
|---|---|---|---|
| 644,932 | 3/1900 | Miller | 72/211 |
| 1,374,604 | 4/1921 | Peters | 29/90 R X |
| 1,802,232 | 4/1931 | Bridwell et al. | 72/211 |
| 2,282,550 | 5/1942 | Trerice | 29/90 R |
| 2,645,953 | 7/1953 | Schlitters | 72/703 X |
| 2,959,841 | 11/1960 | Judge, Sr. | 29/90 R |
| 3,393,437 | 7/1968 | Hutchinson et al. | 72/211 X |
| 3,559,258 | 2/1971 | Gardner | 29/90 R |

FOREIGN PATENTS OR APPLICATIONS

| | | | |
|---|---|---|---|
| 572,939 | 11/1958 | Belgium | 72/211 |
| 129,656 | 1/1929 | Switzerland | 72/211 |

Primary Examiner—Harrison L. Hinson
Attorney, Agent, or Firm—Phillips, Moore, Weissenberger Lempio & Strabala

[57] ABSTRACT

A hand-held burnishing tool for setting gemstones in a mounting wherein the burnishing surface comprises a rotating wheel having a hardened peripheral surface, the wheel mounted on a bearing and rotatable about the longitudinal axis of the handle. Urging the hardened peripheral surface against a soft metal gemstone mounting while revolving the tool about the perimeter of the mounting, causes the wheel to roll about the mounting and results in turning the edge against the stone avoiding scrape marks and scratches which can occur when a conventional blade burnisher is used. Crimps which may occur during the burnishing process may be easily worked out by repeated passes of the tool. By provision of various surfaces of revolution incorporated in the hardened peripheral surface, the edge of the mounting may be turned in a manner not readily obtainable with a conventional blade burnisher, including cold working a design in the edge while burnishing.

7 Claims, 8 Drawing Figures

U.S. Patent  April 27, 1976  3,952,389
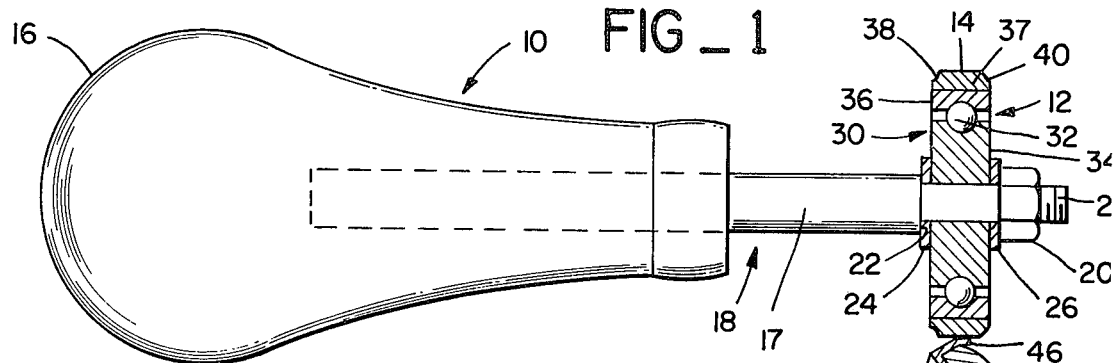
FIG_1
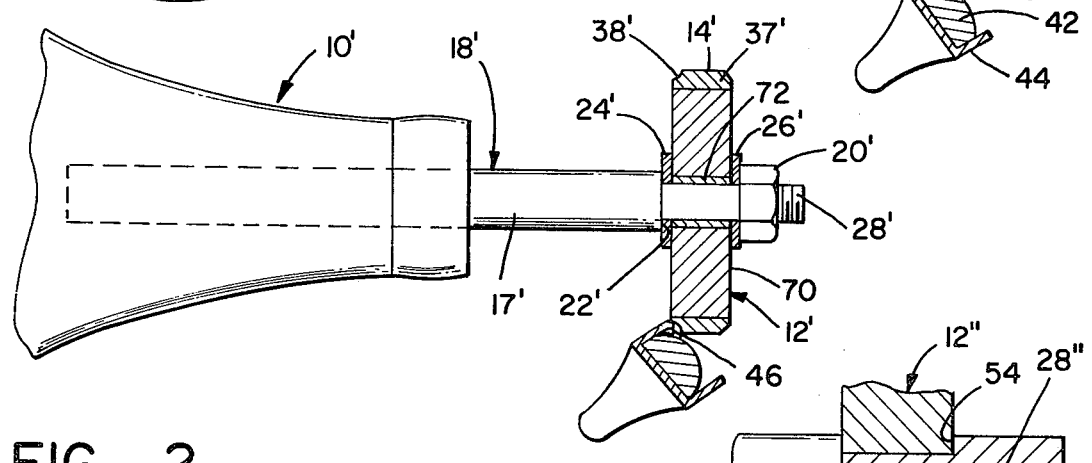
FIG_2
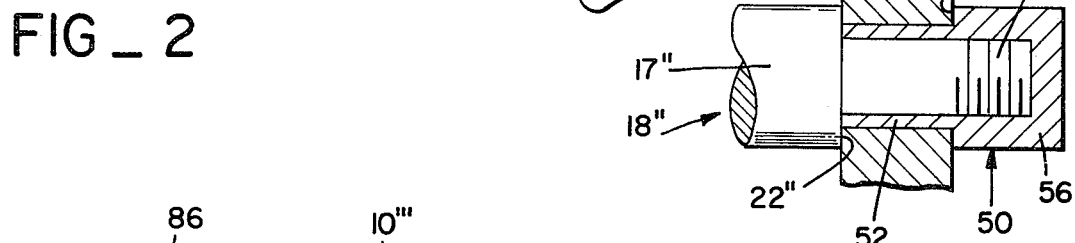
FIG_3
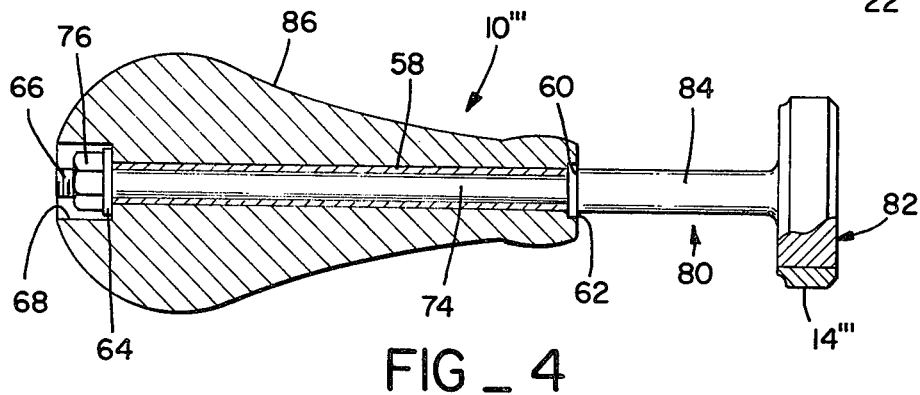
FIG_4
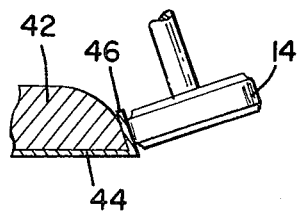
FIG_5
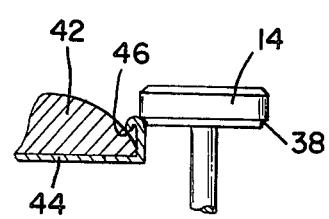
FIG_6
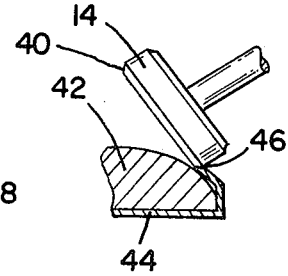
FIG_7
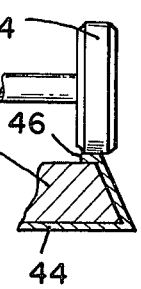
FIG_8

BURNISHING TOOL

BACKGROUND OF THE INVENTION

Gemstones are usually mounted in a device which will enhance the characteristics of the stone. The particular mounting, which may be a bezel, a basket, a pronged box, or delicate wire prongs, must be worked inwardly against the stone to retain it in the setting. The bezel has proved very useful in modern jewelry mounting. A bezel usually refers to a cup-shaped mounting having a bottom or mounting surface and perpendicular sides. The mounting surface may be either continuous or defne in the mounting surface a bore slightly smaller than the diameter of the stone to be mounted.

In order to retain the stone in the bezel, it is necessary to turn the perpendicular wall of the bezel inwardly and down so that it rests against the stone. A conventional burnishing tool, used to accomplish this working of the wall, comprises a polished hardened steel blade of substantially oval cross-section set in a handle. The blade may be slightly curved or straight. In order to set the stone, the stone is placed in the bezel against the bearing surface. The wall of the cup-shaped bezel extends upwardly sufficiently to securely retain the stone in the bezel after the wall of the bezel has been turned inwardly against the stone. In order to so turn the wall, the blade of the burnisher is urged against the top edge of the wall of the bezel turning the wall inwardly against the stone. As the edge is turned down it must also be cold worked by the conventional burnisher by a rocking or rubbing motion to compact the soft metal thus decreasing the circumference of the wall of the cup-shaped bezel so that the wall slopes inwardly against the stone. Failure to properly cold work the edge results in unsightly crimp marks and scratches about the perimeter of the mounting. To develop a skill in using a conventional burnisher requires a great deal of practice by the craftsman, not to mention material wasted in the learning process.

SUMMARY OF THE INVENTION

Accordingly, it is an object of this invention to provide a hand-held burnishing tool with a rotating hardened surface which when urged against soft metal surfaces will roll about the edge rather than rub, thereby smoothly turning the edge without the hardened surface scraping the edge as the burnisher traverses the perimeter of the surface.

It is also an object of this invention to provide a hand-held burnisning tool which may be efficiently used by a craftsman having less skill than an experienced artisan.

It is a still further object of this invention to provide a rotating burnishing tool which, while fulfilling the above objects, through bearing means rotates freely about the longitudinal axis of the tool, thereby turning an edge in a convenient and expeditious manner while avoiding unsightly crimps.

It is a still further object of this invention to provide a rotating burnishing tool which, while fulfilling the above objects, provides a hardened surface having a concave surface of revolution circumferentially oriented around one edge of the hardened surface in order to smoothly roll over an edge.

It is still a further object of this invention to provide a rotating burnishing tool which, while fulfilling the above objects, provides a beveled surface circumferentially oriented around one edge of the rotating burnishing surface in order to smoothly form a flattened edge.

It is also an object of this invention to provide a hand-held burnishing tool wherein the rotating hardened surface may readily be changed.

It is a still further object of this invention to provide a method of burnishing an edge of a mounting for a gemstone.

Broadly stated, this invention is a burnishing tool with a rotating surface for working soft metals, the tool comprising an elongated handle and a shaft having one end mounted in the handle. Mounted on the other end of the shaft is a wheel shaped burnishing means with a hardened peripheral surfce, the burnishing means being rotatable about the longitudinal axis of the handle. Means are included for reducing friction in the rotation of the burnishing means about the handle.

Broadly stated, this invention also encompasses a method of burnishing an edge utilizing a hardened surface of a rotating burnishing wheel by applying a force normal to the edge and normal to the axis of rotation while applying a second force perpendicular to the first force and tangential to the edge, all the while rotating the burnishing wheel about the edge of the soft metal.

BRIEF DESCRIPTION OF THE DRAWINGS

These and other objects of the invention will become apparent from a study of the following specification and drawings, in which:

FIG. 1 is a drawing partly in cross-section of the preferred embodiment of the invention utilizing a bearing with rolling elements;

FIG. 2 shows an alternate embodiment of the invention utilizing a sleeve bearing means;

FIG. 3 shows a third embodiment of the invention, showing the burnishing wheel in part, the burnishing wheel mounted on a combination bearing and retaining nut;

FIG. 4 shows a fourth embodiment of the invention, showing the bearing means positioned coaxially around the shaft and within the handle means, and also showing retention means located within a cavity in the handle; and FIGS. 5, 6, 7 and 8 illustrate various applications of the burnising tool in burnising a bezel.

DESCRIPTION OF THE PREFERRED EMBODIMENT

Shown in FIG. 1 is a burnishing tool 10 having a wheel-shaped burnishing means 12 with a hardened peripheral surface 14. The burnishing tool 10 comprises an elongated handle means 16 designed to be conveniently held in the human hand. A shaft means 18 is retained at one end in the handle means 16. Projecting end 17 of shaft means 18 projects from handle 16, and the axis of shaft means 18 is generally aligned with the longitudinal axis of handle means 16. The wheel-shaped burnishing means 12 with a hardened peripheral surface 14 is mounted on projecting end 17 and is rotatable about the longitudinal axis of handle means 16. A shoulder 22 is defined on projecting end 17 near the extreme end of projecting end 17, projecting end 17 being of lesser diameter for its remaining length, the shoulder forming an edge against which burnishing means 12 abuts thereby preventing burnishing means 12 from moving inwardly on projecting end 17. A washer 24 may be disposed between shoulder 22 and burnishing means 12. Burnishing means 12 is retained on projecting end 17 by a retention means comprising washer 26 disposed outwardly of burnishing means 12 when burnishing means 12 is mounted on projecting end 17; threaded extension 28 to projecting end 17; and retention nut 20 threadably engageable on threaded extension 28 outwardly of washer 26.

A bearing means 30 is coaxially mounted with shaft means 18 to reduce frictiion in the rotation of burnishing means 12 about the longitudinal axis of the elongated handle means 16. In the preferred embodiment, bearing means 30 comprises rolling elements 32, here shown as balls, however, suitable rollers may be used in lieu thereof; inner ring 34 which is coaxially mounted on projecting end 17 of shaft means 18 abutting shoulder 22; and outer ring 36. Outer ring 36 carries a hardened metal tire 37 rigidly affixed around its circumference. Hardened metal tire 37 defines the hardened peripheral surface 14. Alternatively the peripheral surface of a metal outer ring 36 may be hardened to form hardened peripheral surface 14. Circumferentially oriented around one outer edge of hardened peripheral surface 14 is concave surface of revolution 38, and similarly circumferentially located around the other or second outer edge of hardened peripheral surface 14 is a beveled edge 40. The purpose of concave surface of revolution 38 and beveled edge 40 will become apparent in later discussion of the operation of burnishing tool 10.

In operation, a stone 42 is placed in a soft metal bezel 44. Hardened peripheral surface 14 of burnishing tool 10 is urged against upper edge 46 of bezel 44 while rotating the burnishing tool 10 around the perimeter of upper edge 46 of bezel 44. The force applied to upper edge 46 of bezel 44 by hardened peripheral surface 14 while burnishing tool 10 is so urged against upper edge 46 of bezel 44 comprises a first force having a vector normal to the axis of rotation of wheel-shaped burnishing means 12 directed toward and normal to upper edge 46 of bezel 44; and a second force having a vector normal to the first force vector directed tangentially to upper edge 46 of bezel 44 and opposite to the direction of rotation of wheel-shaped burnishing means 12. Such rotation and urging of burnishing tool 10 around bezel 44 burnishes edge 46 thereby resulting in the retention of stone 42 in bezel 44. The direction of rotation of burnishing tool 10 about bezel 44 may be periodically reversed in order to prevent a wave from forming in advance of peripheral surface 14 which would create a crimp in the edge 46 of bezel 44. In the event such a crimp forms in edge 46 while rotating peripheral surface 14 of burnishing tool 10 about bezel 44, such a crimp may be easily worked out by repeated passes of hardened surface 14 over the unwanted crimp in edge 46.

Referring to FIG. 5, hardened peripheral surface 14 has conventionally burnished edge 46 against stone 42. Referring to FIG. 6, application of concave surface of revolution 38 to edge 46 results in edge 46 being rolled over in the burnishing process thereby creating a better gripping surface on stone 42. Referring to FIG. 7, hardened surface 14 may also be applied to edge 46 to form an angular burnish about stone 42. By applying beveled edge 40 to edge 46 after the conventional burnish is formed, as shown in FIG. 5, or the angular burnish in FIG. 7, a flattened lip to edge 46 may be formed which is not possible with the conventional blade burnishing tool.

Referring to FIG. 8, if stone 42 is a frustum, a conventional bezel may be formed with hardened surface 14 as in FIG. 5, then hardened surface 14 may further turn over edge 46 to lie on the top surface of the frustum stone 42.

Alternate embodiments of the invention are shown in FIGS. 2, 3 and 4. These alternate embodiments relate primarily to the bearing means for enabling the hardened surface 14 to rotate about the longitudinal axis of handle 16. In all the alternate embodiments, the configuration of hardened surface 14 remains as in the preferred embodiment. In FIG. 2, burnishing means 12', comprises ring 70 which has a peripherally hardened surface 14', such hardened surface 14' being a metal tire 37' affixed around ring 70 which is mounted on a sleeve bearing 72. Sleeve bearing 72 reduces friction in the rotation of burnishing means 12' which is rotatably mounted on projecting end 17' of shaft means 18'. Projecting end 17' defines shoulder 22' against which washer 24' abuts thereby preventing burnishing means 12' from moving inwardly on projecting end 17'. Washer 26' is located on the outward side of burnishing means 12', retention nut 20' threadably engaged on threaded extension 28' retaining rotating burnishing means 12' on projecting end 17'. Applicaton of concave surface of revolution 38' to edge 46' resulting in a rolled over edge is illustrated in FIG. 2.

FIG. 3. illustrates an alternative sleeve bearing arrangement. Retention means 50 carries a bearing 52. Such bearing 52 acts as a sleeve bearing for burnishing means 12'' which is rotatably engaged thereon while retention means 50 is threadably engaged on threaded extension 28''. Burnishing means 12'' abuts shoulder 22'', formed at the juncture of threaded extension 28'' and projecting end 17'', extension 28'' having a smaller diameter than projecting end 17''. Retention means 50 defines a large end 56 having a shoulder 54 formed at the juncture of enlarged end 56 and bearing 52. Burnishing means 12'' when retained on bearing 52 abuts shouler 22'' and shoulder 54. Burnishing means 12'' is free to rotate on bearing 52 thereby fulfilling the requirement of rotation about the longitudinal axis of the elongated handle means.

FIG. 4 illustrates a bearing arrangement located within elongated handle means 86. Shaft means 80 carries burnishing means 82 having a hardened peripheral surface 14''' as an integral part of projecting end 84. Alternatively burnishing means 82 may be slidably affixed to projecting end 84 and retained thereon by a washer and retention nut as in the primary embodiment. Coaxially located between bearing end 74 of shaft means 80 and handle means 86 is an elongated sleeve bearing 58. Shaft means 80 defines a shouler 60 at the juncture of smaller diameter bearing end 74 and larger diameter projecting end 84, shoulder 60 abutting a washer 62 recessed in the end of elongated handle means 86. Bearing end 74 extends through sleeve bearing 58 in elongated handle means 86 and has rotatably mounted thereon at its extreme end a washer 64 to provide free rotation of shaft means 80 within eongated handle means 86. A threaded extension 66 of bearing end 74 extends beyond washer 64 to receive a retention nut 76. Retention nut 76 and threaded end 66 are contained in a cavity 68 defined in the end of elongated handle means 86 in order to avoid discomfort to the user of burnishing tool 10'''.

The primary embodiment and alternate embodiments described and illustrated herein are not meant to limit the concept of this inventon. This concept encompasses a hardened surface burnishing means rotating about the axis of an elongated handle means, and having a capability to readly change the rotating surface of the burnishing means. The hardened peripheral surface of the burnishing means, although shown here as a smooth surface having a concave surface of revolution around the one edge and a bevelled edge around the other opposite edge should not be considered as limiting. Such surfaces may carry thereon a design to emboss a pattern in the surface of a soft metal bezel in which a stone may be placed. It is further emphasized that this burnishing tool is not to be considered limited to the working of a soft metal bezel but may be used in other similar applications.

What is claimed is:

1. A hand-held burnishing tool for working soft metals comprising:

an elongated cylindrical handle means capable of being manually held;

a shaft means having one end fixedly retained in said handle means and the other end projecting therefrom, said shaft means having its longitudinal axis generally aligned with the longitudinal axis of said elongated cylindrical handle means;

bearing means mounted on the distal end of the projecting end of said shaft means; and a cylindrical shaped burnishing wheel rotatably mounted on said bearing means so its axis of rotation is coaxial with the longitudinal axis of said shaft means, said burnishing wheel having a hardened first peripheral central surface or revolution which is a flat surface of revolution and at least one hardened second peripheral surface of revolution adjacent to one edge thereof which is angularly disposed with reference to said first peripheral surface of revolution whereby a craftsman may employ either of said two surfaces of revolution when utilizing the tool to work soft metal surfaces.

2. The hand-held burnishing tool defined in claim 1 wherein the hardened first peripheral surface of revolution is substantially larger than said hardened second peripheral surface of revolution.

3. The hand-held burnishing tool defined in claim 1 wherein the cylindrical shaped burnishing wheel has a hardened third peripheral surface of revolution at the edge of said wheel opposite the edge thereof having the hardened second peripheral surface of revolution whereby three separate working surfaces are provided to the craftsman employing said hand-held burnishing tool.

4. The hand-held burnishing tool defined in claim 1 wherein the burnishing wheel is detachably mounted on the bearing means.

5. The tool set forth in claim 1 further comprising retention means for retaining said bearing means and said burnishing means on said shaft means, said retention means comprising:

a threaded extension on the projecting end of said shaft means;

a nut threadably engaged on said threadable extension; and a washer fitting about said means positioned between said nut and said burnishing means.

6. The tool set forth in claim 5 wherein the second hardened peripheral surface of revolution of said burnishing wheel is a concave surface of revolution circumferentially oriented around one edge of said burnishing wheel whereby said concave surface of revolution can be urged against a soft metal surface to smoothly burnish an edge thereof.

7. The tool set forth in claim 6 wherein said second hardened peripheral surface of said burnishing wheel defines a beveled surface circumferentially oriented around one edge of said burnishing wheel whereby said beveled edge can be urged against a soft metal surface to smoothly form a flattened edge thereof.

* * * * *